US006413290B1

(12) United States Patent
Gruber (10) Patent No.: US 6,413,290 B1
(45) Date of Patent: Jul. 2, 2002

(54) FILTER CARTRIDGE WITH DETECTION DEVICE

(76) Inventor: Thomas J. Gruber, 9870 Hobart Rd., Waite Hill, OH (US) 44094

( * ) Notice: Subject to any disclaimer, the term of this patent is extended or adjusted under 35 U.S.C. 154(b) by 0 days.

(21) Appl. No.: 09/728,519

(22) Filed: Dec. 1, 2000

Related U.S. Application Data

(60) Provisional application No. 60/169,064, filed on Dec. 6, 1999.

(51) Int. Cl.[7] .............................................. B01D 27/02
(52) U.S. Cl. ............................. 55/507; 55/509; 96/137; 96/149; 210/352; 210/446
(58) Field of Search ......................... 55/363, 486, 507, 55/509, 518; 96/137, 138, 149, 414, 417; 210/266, 282, 352, 446

(56) References Cited

U.S. PATENT DOCUMENTS

| 2,175,195 A | * | 10/1939 | Irvine ........................... 55/509 |
| 3,347,387 A | | 10/1967 | Balogh |
| 3,348,692 A | | 10/1967 | Balogh |
| 3,407,936 A | | 10/1968 | Balogh |
| 3,411,629 A | | 11/1968 | Wilber et al. |
| 3,417,551 A | * | 12/1968 | Bonell .......................... 55/498 |
| 3,680,707 A | | 8/1972 | Zeek |
| 4,128,408 A | * | 12/1978 | Poole ........................... 55/498 |
| 4,758,460 A | * | 7/1988 | Spicer et al. .................. 55/486 |
| 4,838,905 A | * | 6/1989 | Billiet et al. ................... 55/486 |
| 5,217,606 A | | 6/1993 | Ramponi et al. |
| 6,004,365 A | * | 12/1999 | Fiacco ........................... 55/507 |
| 6,277,166 B2 | * | 8/2001 | Zettel et al. ................ 55/385.3 |

* cited by examiner

Primary Examiner—David A. Simmons
Assistant Examiner—Minh-Chau Pham
(74) Attorney, Agent, or Firm—Fay, Sharpe, Fagan, Minnich & McKee, LLP (57) ABSTRACT

A filtering device for treating substances passing therethrough includes a filter cartridge having a cylindrical inner wall surrounded by a cylindrical outer wall. The inner and outer walls are spaced to define an annular space between them. A filtering media occupies the annular space and operates to remove contamination from a fluid flowing through the filter cartridge. First and second covers are located at opposite axial ends of the filter cartridge for sealing the system. At least one biasing assembly is disposed at one axial end of the filter cartridge for applying an approximately constant compression force to the filter medium. The compression force minimizes the formation of voids and the occurrence of bridging within the filtering media. A sensing mechanism, such as a Hall Effect sensor, can be applied to the filter cartridge for detecting changes in the filtering media which indicate the formation of voids or defects in the filtering media.

20 Claims, 7 Drawing Sheets

FILTER CARTRIDGE WITH DETECTION DEVICE

This application claims priority from provisional application No. 60/169,064, filed Dec. 6, 1999.

BACKGROUND OF THE INVENTION

1. Field of the Invention

The present invention generally pertains to filter assemblies for treating contaminated air passing therethrough. More particularly, the invention relates to a filter assembly for removing toxic aerosols from the air that is designed to minimize the formation of voids and the occurrence of bridging in a filter media in the filter assembly, even over extended periods of time. The filter assembly is also provided with a detection mechanism which enables an operator to determine the extent to which the filter has become defective.

2. Discussion of the Prior Art

Filter systems, such as charcoal filters and paper filters, for treating air have a wide variety of applications which are well known in the art. Such filters are commonly used as breathing apparatus for fire fighters, miners, and soldiers in the field. Additionally, these filters are often used in the military in such things as vehicles, ships, and the like, in the event that troops are exposed to toxic agents or poisonous gases. A particular military concern is the exposure of crew members of a naval ship to toxic gases, for example, generated by rockets flying nearby. A rocket employed for germ warfare could release anthrax or other deadly materials. These would pose serious health dangers to the occupants of a ship.

Nuclear, biological, and chemical filtration devices, commonly referred to as "NBC" devices, are currently available to the Government and other consumers to treat contaminated air in environments described above as well as other environments. NBC devices generally employ a filtration cartridge which filters air that enters the subject environment. A conventional filtration cartridge comprises a cylindrical inner ring-like wall surrounded by a cylindrical outer wall. The inner and outer walls are usually formed from a perforated metal material and are co-axially disposed to define an annular filtering space therebetween. A filtering media occupies the space defined between the inner and outer cylindrical walls. The filtering media is usually a granulated charcoal material but could be any other appropriate absorbent material. Axial end walls are disposed at both ends of the cartridge. In operation, air is drawn radially into the cartridge and filtered by the absorbent media. The airflow can be either radially inward or radially outward through the filter media.

During storage and in use, the filter cartridge is subjected to vibration and may possibly even be dropped. If continuous pressure is not kept on the filter media, the particles will begin to abrade one another. As the particles grind themselves into dust, the apparent density or packaging density of the filter media increases. This means the amount of carbon originally placed in the filter now occupies a smaller space. This process is self-supporting because as voids are formed there is room for additional abrading. If voids form in the granulated filter media and these are not filled, bridging occurs. Toxic gases such as nerve gases, anthrax, or other aerosols will pass through the voids and out the perforated screen walls of the filter cartridge. Obviously, this creates a hazardous condition. As one can appreciate, the elimination of voids and bridging is critical to the safety of military personnel. An important feature of the known filter system is the provision of compression pads located at one or both ends of the filter cartridge. The compression pads operate to exert pressure (at approximately 5,000 psig) in the longitudinal direction on the granulated filtering medium compacting the absorbing particles. As pressure is increased, the potential for voids and bridging is diminished.

Currently, the compression pads in conventional filtering devices suffer from at least one significant shortcoming. The pads are usually made from a rubber material. However, the rubber does not have sufficient memory after a period of two or three days to maintain a constant compression force on the granulated filter material. Therefore, after a certain period of time, rubber compression pads cannot be relied upon to exert a specific force. As such, the known filter devices are prone to suffer from voids and bridging resulting in the dangerous conditions previously discussed.

Another shortcoming of present filter cartridges is the inability to perform a non-destructive evaluation prior to placing the unit into service. It is not uncommon for filter assemblies to sit in storage for long periods of time. During their lifetime, they are often dropped during transport or are subject to vibration, both of which may cause voids or defects in the filter assembly. Currently, a representative sample of filters is subjected to destructive testing prior to acceptance. Representative testing is not capable of testing each individual filter assembly. Moreover, after this testing, no further evaluation of the filter is made during the filter's lifetime, even after potentially damaging impacts or severe vibrations.

Accordingly, it has been considered desirable to develop a new and improved filtering device capable of applying a continuous and specific compression force on the filtering medium, thereby minimizing the formation of voids and the occurrence of bridging. Also, a filter assembly capable of being evaluated for voids and defects in a non-destructive manner would be of benefit to both a manufacturer and an end user.

SUMMARY OF THE INVENTION

In accordance with the present invention, a new and improved filtering device with a non-destructive testing device is provided.

More particularly, in accordance with one aspect of the present invention, a filter assembly with a non-destructive testing device includes a substantially toroidal filter cartridge having a first outer cylindrical wall spaced from and surrounding a second inner cylindrical wall. The outer and inner walls define an annular space therebetween. A filtering media is disposed within the annular space for removing contaminants from a medium passing through the filter cartridge. A first biasing assembly is located at a first axial end of the filter cartridge for exerting a constant and specific compression force on the filtering media. A sensing mechanism to be applied to the filter cartridge detects changes in the biasing assembly which result from the formation of defects in the filtering media.

In accordance with another aspect of the present invention, a filter assembly includes a substantially toroidal filter cartridge having a first outer cylindrical wall spaced from and surrounding a second inner cylindrical wall. The outer and inner cylindrical walls define an annular space therebetween. A filtering media is disposed within the annular space for removing contaminants from a medium passing through the filter cartridge. A first pre-compressed biasing assembly is disposed at a first axial end of the filter cartridge.

The first biasing assembly has at least a portion configured to unload and spread in a direction other than an axial direction of the filter cartridge when a force exerted by the filtering media exceeds a loading of the biasing member.

A preferred method of non-destructively testing a filter assembly to verify continuity of a filtering media disposed within a filter cartridge of the filter assembly includes pre-compressing a biasing member to a predetermined load. The biasing member is then positioned adjacent a first axial end of the filter cartridge so that the biasing member applies a continuous and constant force on the filtering media. The spread and unloading of the biasing member is then measured with a Hall Effect sensing mechanism.

One aspect of the present invention is the provision of a new and improved filter cartridge for treating contaminated fluids.

Another aspect of the present invention is the provision of a filter cartridge employing a granular filter media in which voids and bridging of the granular media is minimized.

Still another aspect of the present invention is the provision of a filter cartridge employing a spring assembly capable of applying a specific compression force to a filtering medium over an extended period of time.

Yet another aspect of the present invention is the provision of an annular filter cartridge employing a granular filter media and at least one spring member which exerts an axial compression force on the granular filter media.

A further aspect of the present invention is the provision of a non-destructive testing means for a filter cartridge to determine whether voids or defects have formed in the filter media held in the filter cartridge.

A still further aspect of the present invention is the provision of a means for determining the remaining compressive force in each spring assembly of a filter cartridge without destroying the filter cartridge. This is done through the use of a sensing mechanism which can detect the location and spread of a spring assembly within the walls of the filter cartridge. The values obtained with the measuring device could be compared to the values measured when the filter cartridge was originally constructed, and a determination made as to the condition of the filter cartridge.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, several embodiments of which will be described in detail in this specification and illustrated in the accompanying drawings which form a part hereof and wherein:

FIG. 7b is a cross-sectional view taken along lines A—A of the compression pad of FIG. 7a;

FIG. 7c is a cross-sectional view of a spring member being received by a first toroidal annular member of the compression pad of FIG. 7a;

FIG. 8b is a front elevational view of the sensing mechanism of FIG. 8a;

FIG. 9b is an exploded side elevational view, partially in cross-section, of the compression pad of FIG. 9a.

DETAILED DESCRIPTION OF THE PREFERRED EMBODIMENTS

Figure 1:
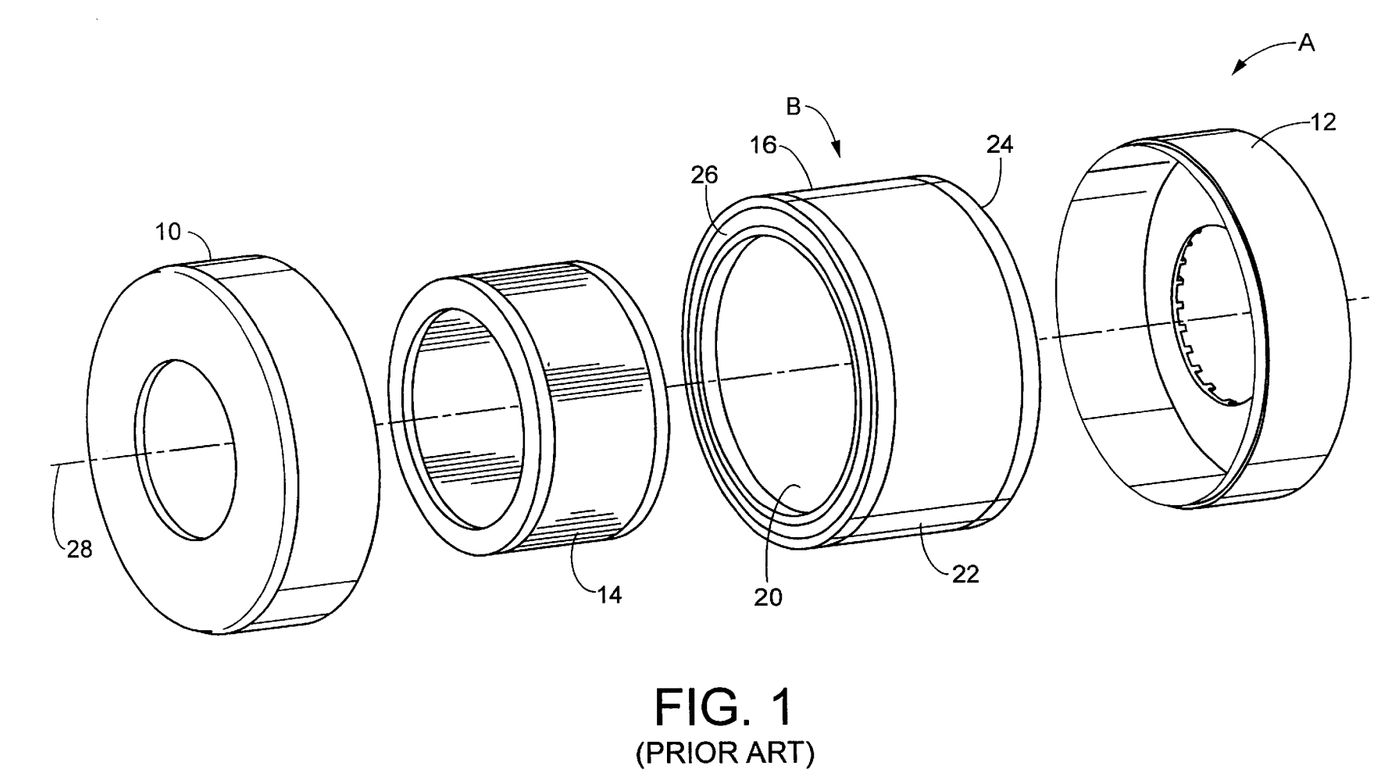
FIG. 1 is an exploded perspective view of the components of a conventional filtering set.
Figure 2:
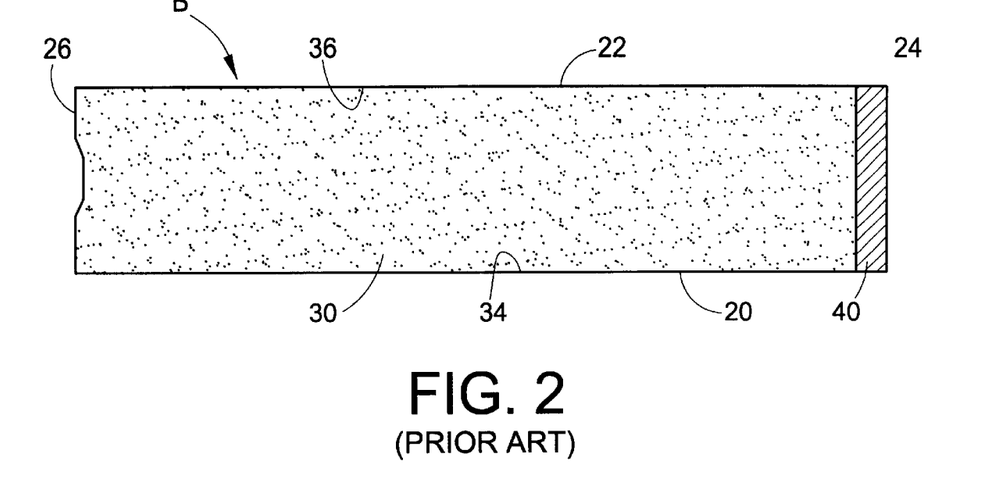
FIG. 2 is a cross-sectional view of a conventional filter cartridge of the filtering set of FIG. 1.

Referring now to the drawings, wherein the showings are for purposes of illustrating the preferred embodiments of the invention only and are not for purposes of limiting the same, FIGS. 1–2 show a conventional filter device while FIGS. 3–9b illustrate new filter devices in accordance with the present invention. While the filter device illustrated is primarily designed for and will hereinafter be described in connection with the filtering of air for breathing, it should be appreciated that the overall inventive concept could be adapted for use in many other environments where filter cartridges are utilized.

More particularly, and with reference to FIG. 1, a conventional filter assembly A includes a pair of metal frames, such as aluminum spinnings 10, 12 which operatively connect to form an outer shell. The outer shell functions as a storage and shipping container capable of quick and easy opening. The metal frames house a particulate filter 14, which removes large contaminants and prevents premature clogging of the filter cartridge. As is well known in the art, the filter material of the particulate filter is generally pleated paper. However, any other conventional material is within the scope of this invention. Also enclosed within the metal frames is a filter cartridge B which is the focus of the present invention.

The conventional filter cartridge B is annular in shape defining a central channel 16 extending therethrough. The annular filter cartridge B includes a cylindrical inner wall 20 surrounded by a cylindrical outer wall 22. The inner and outer walls are co-axially disposed and are usually formed from a perforated metal material. The walls are spaced from one another to define an annular space therebetween. With reference now to FIG. 2, first and second ring-like axial end walls or covers 24, 26 are disposed at opposite ends of the cartridge about a longitudinal axis 28 (See FIG. 1) of the filter and are adapted to seal the system. The end walls are not perforated so that air is forced to enter and exit the filter cartridge in the radial direction.

A filtering media 30 occupies the space defined by the ring-like walls 20, 22. The filtering media operates to remove contaminants as air passes through the cartridge in the radial direction. The filtering media is often formed from a granulated material, for example a carbon material such as charcoal.

Fines media 34, 36 in a conventional filter assembly are located adjacent an inner side of both the inner and outer cylindrical walls 20, 22. The fines media are held in place by a suitable adhesive material at the axial ends of the filter cartridge. The fines media is generally in the form of a cotton cloth material having a fine mesh. The purpose of the fines media is to prevent migration of activated charcoal particles through the perforated walls 20, 22.

With continued reference to FIG. 2, a compression pad 40 is located at one axial end of the filter cartridge. Optionally, a second compression pad (not shown) may be disposed at the opposite axial end of the filter cartridge. The compression pads operate to exert pressure (conventionally at approximately 5,000 psig), in the longitudinal direction, on the filtering media causing the absorbent particles to contact one another and become compact. By making the filtering media compact, voids and bridging are minimized.

Conventional compression pads are formed from a rubber material. However, it has been determined that rubber does not have sufficient memory after a period of two or three days to maintain a constant compression force. Therefore, after a certain period of time, rubber compression pads cannot be relied upon to exert a specific force. As such, the present devices are prone to suffer from voids and bridging resulting in the dangerous conditions mentioned above.

Figure 3:
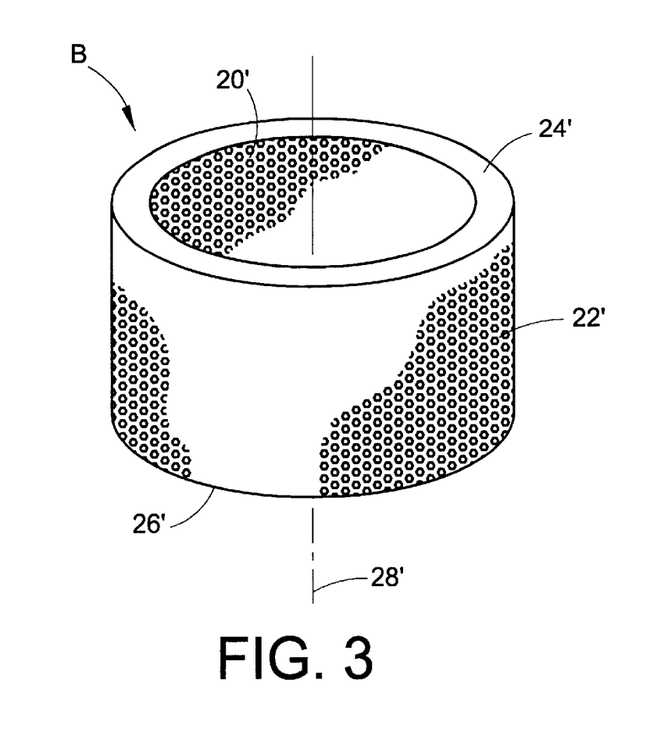
FIG. 3 is a perspective view of a filter cartridge in accordance with a first preferred embodiment of the present invention.

With reference now to a first embodiment of the present invention, FIG. 3 illustrates an improved filtering cartridge. For ease of illustration and appreciation of this embodiment, like components are identified by like numerals with a primed (') suffix and new components are identified by new numerals.

In FIG. 3, a filter cartridge B includes a pair of spaced cylindrical walls 20', 22' defining an open annular space. First and second ring-like axial end walls or covers 24', 26' are disposed at opposite ends of the cartridge about a longitudinal axis 28' of the filter cartridge and are adapted to seal the system.

Figure 4:
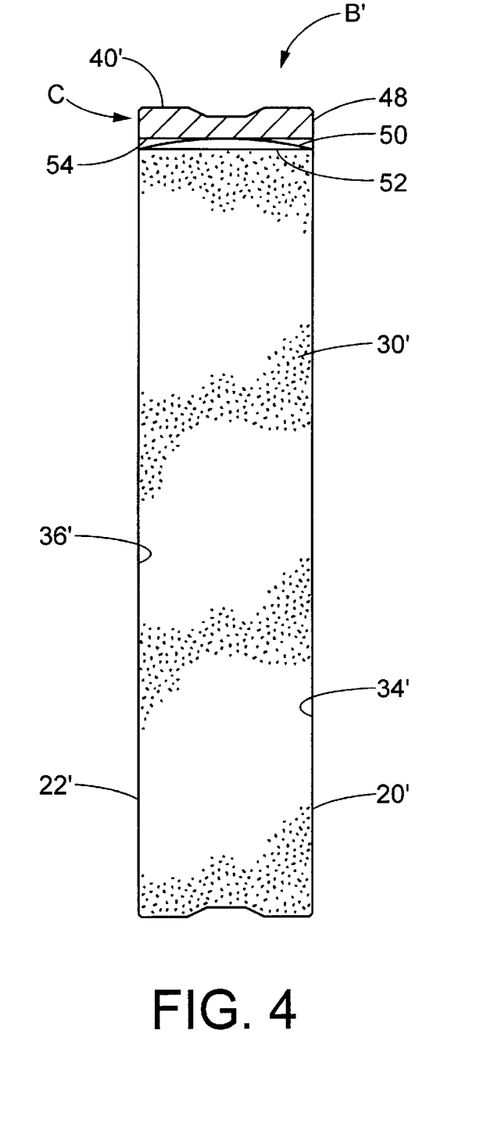
FIG. 4 is a cross-sectional view of the filter cartridge of FIG. 3 illustrating the use of a compression spring.

With reference to FIG. 4, a filtering media 30' occupies the space defined by the two ring-like walls 20', 22'. In the illustrated embodiment, a specially treated granulated charcoal is used as the filtering media. The charcoal granules are of a specific size range as is known in the art. However, it will be appreciated that any conventional filtering media is within the scope of the present invention.

A fines media 34', 36' is located adjacent an interior side of both the inner and outer cylindrical walls 20', 22'. They are held in place by a suitable adhesive material. Additionally, a compression pad 40' is located at one end of the filter cartridge B'.

With continued reference to FIG. 4, a first biasing or spring assembly C is disposed at a top end 48 of the filter cartridge B'. The spring assembly includes a first spring 50 located between two flat washer discs 52, 54. The addition of these elements allows a constant compression force to be applied to the filtering media 30' via the first spring 50. The first spring 50 is preferably made of a tempered metal. One suitable type of spring would be a Belleville spring. However, other types of springs can also be employed. Through the use of such a spring, a specific force can be exerted upon the filtering media. The ability of the present invention to apply a constant and specific compression force to the filtering media over an extended period of time assures that voids and bridging will be minimized. In contrast, conventional rubber compression pads do not assure such a result.

One embodiment of such a filter is capable of filtering air at a rate of 200 cubic feet per minute. If desired, a set of such filters, perhaps five, could be used in combination. The filters can be used on military vehicles, such as ships or tanks, as well as in buildings, such as embassies.

Figure 5:
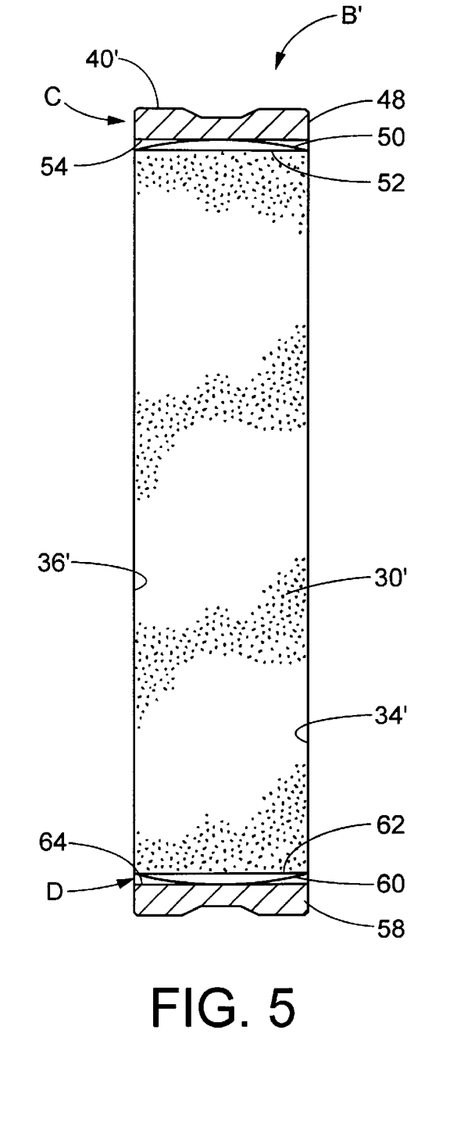
FIG. 5 is a cross-sectional view a filter cartridge according to a second preferred embodiment of the present invention, incorporating two compression springs.

Referring now to FIG. 5, another preferred embodiment of the present invention is there illustrated. In this embodiment, a second biasing or spring assembly D is disposed at a bottom end 58 of the filter cartridge. The second spring assembly includes a second spring 60 located between two flat washers 62, 64. The second spring assembly operates to apply added force to the filter media 30', thereby further reducing the potential for voids and bridging.

Figure 6A:
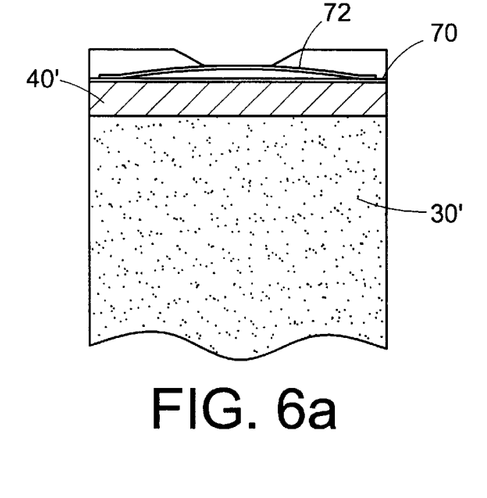
FIGS. 6a–6e are cross-sectional views, partially broken away, each showing a filter cartridge with an alternative compression mechanism according to the present invention.
Figure 6B:
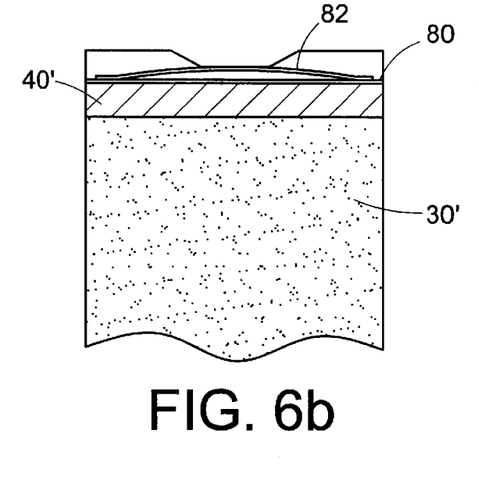
Figure 6C:
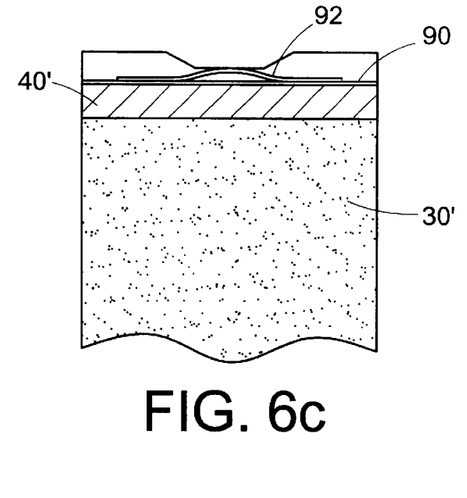
Figure 6D:
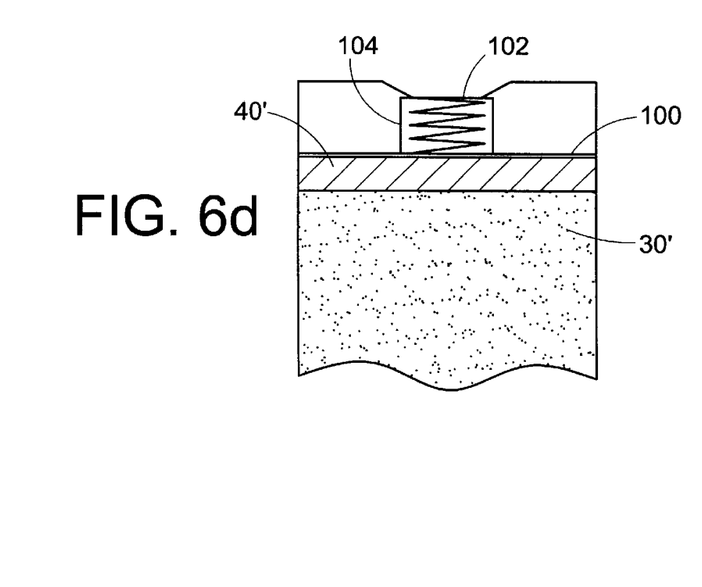
Figure 6E:
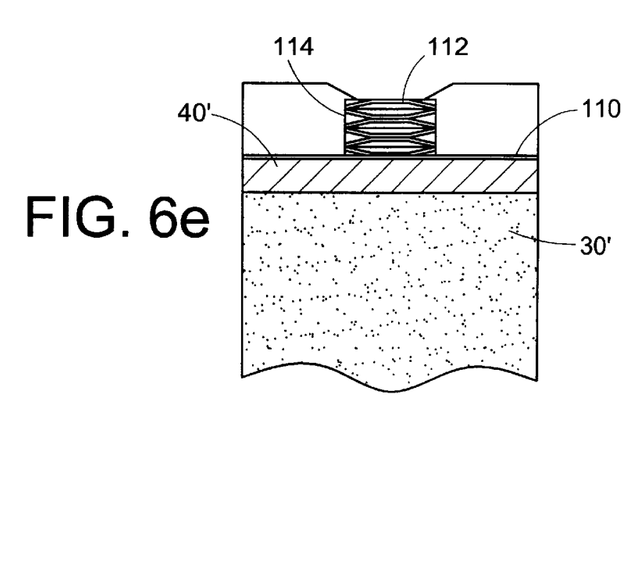

FIGS. 6a–6e illustrate additional spring assemblies in accordance with the teachings of the present invention. FIGS. 6a–6c disclose a washer and a spring on top of the seal pad 40' as opposed to below the pad. FIG. 6a incorporates a washer 70 and a flat spring 72. FIG. 6b illustrates the use of a washer 80 and an annular spring 82. FIG. 6c illustrates the use of a washer 90 and a wave spring 92. FIGS. 6d and 6e have a different spring assembly configuration. FIG. 6d discloses a washer 100 and a coil spring 102 housed in a retainer 104. FIG. 6e discloses a washer 110 and a series of disc springs 112 housed in a retainer 114.

Although a spring assembly has been described throughout this specification as the means for applying a compression force, it must be understood that any type of elastic or resilient member which is capable of applying a specific and substantially constant compression force over an extended period of time may be used without departing from the scope and intent of the present invention.

In a preferred embodiment, the filter assembly has the benefit of allowing the reduction in compressive force in the spring assembly to be measured over time. Preferably, the spring assembly is made from ferrous material and the rest of the cartridge is made from non-ferrous material. Thus, the spread of the spring can be determined using a sensing mechanism such as an eddy-current device. A larger spread of the spring or unloading of the spring indicates a larger reduction in compressive force. The loss of compressive force would indicate that the filter assembly is defective such as by the creation of voids. As previously discussed, the formation of voids is a dangerous and undesirable occurrence.

Figure 7A:
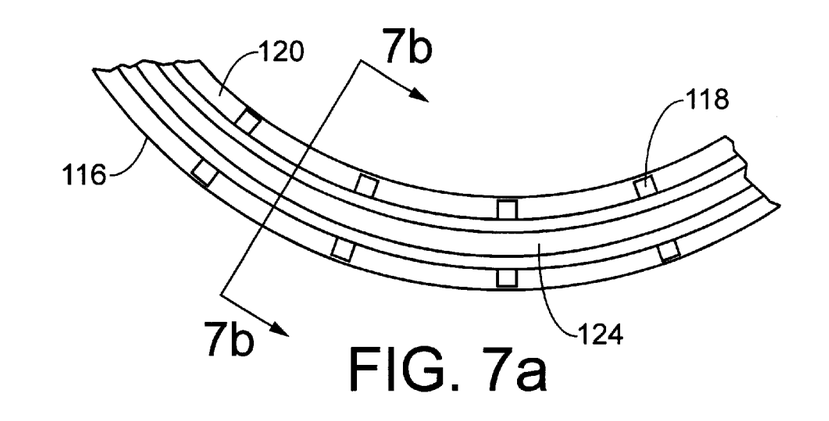
FIG. 7a is a top plan view of a preferred embodiment of a portion of a compression pad incorporating a plurality of spring members which can be tested for spread and deflection.

With reference to FIG. 7a, a top plan view of a portion of a compression pad 116 is shown which, when used in a filter cartridge, enables the filter cartridge to be non-destructively tested for defects. A precision formed progressive rate compression assembly 118 is integrally molded into the compression pad. The compression assembly preferably includes a plurality of spring members 118 arranged circumferentially around the compression pad 116 and partially embedded in the compression pad.

Figure 7B:
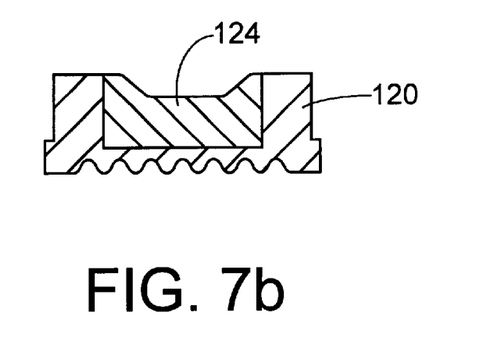
Figure 7C:
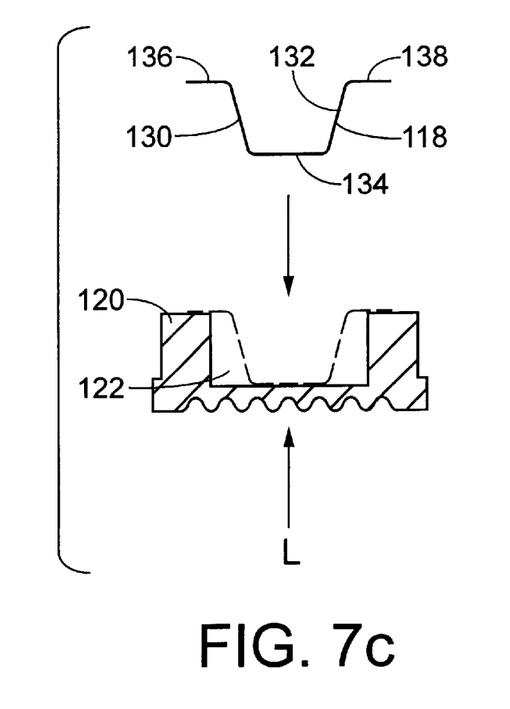

Turning also to FIGS. 7b and 7c, the compression pad comprises a first toroidal or annular member 120 having a recess or channel 122 defined in it (so as to be U-shaped) for receiving a second toroidal or annular member 124 embedded with the plurality of springs 118. In order to achieve the embedded configuration, the springs are first placed in the channel 122 of the first member. (See FIG. 7c.) Subsequentially, rubber or some other suitable material is poured into the channel. Both the first and second members 120, 124 are preferably made from an elastic material, such as rubber.

Each of the springs 118 is a flat member which may, for example be 0.625 inches wide. The springs are embedded in the second toroidal member 124 for maintaining the springs in their proper location. Each of the spring members can be compressed to a spring rate of 0.025 inches deflection which can equal 25 lbs. In their compressed position, each of the spring members has first and second angled side walls 130, 132 interconnected by a horizontal bridge member 134. Each of the spring angled side walls 130, 132 has a horizontal leg 136, 138 extending therefrom which is substantially coplanar with an upper surface of the compression pad.

Although the above describes one desirable orientation and configuration of the spring members with respect to the compression pad, it must be appreciated that the spring members may take on any suitable shape and may be molded, contained within the compression pad, or added as a retrofit.

As bridging and abrading occurs and as voids are formed in the filtering media of the cartridge, the pressure or load L exerted by the filtering media on the compression pad and spring members is decreased. This decreased pressure unloads the spring, thereby causing legs 136, 138 to flex or deflect inwardly toward each other. As the pressure or load decreases, the legs 136, 138 will undergo a greater inward flexing towards one another. In other words, since the spring members have memory, the legs will move inwardly toward their natural position.

In order to determine whether the apparent porosity of the filtering media has changed or whether voids have formed, it is desirable to measure the amount of deflection or spread experienced by the spring members which corresponds to pressure changes in the filtering media. If the spring members are made from ferrous material and the rest of the filter cartridge is made from non-ferrous material, the spread or deflection of the spring members can be determined using a sensing mechanism such as an eddy-current device.

Figure 8A:
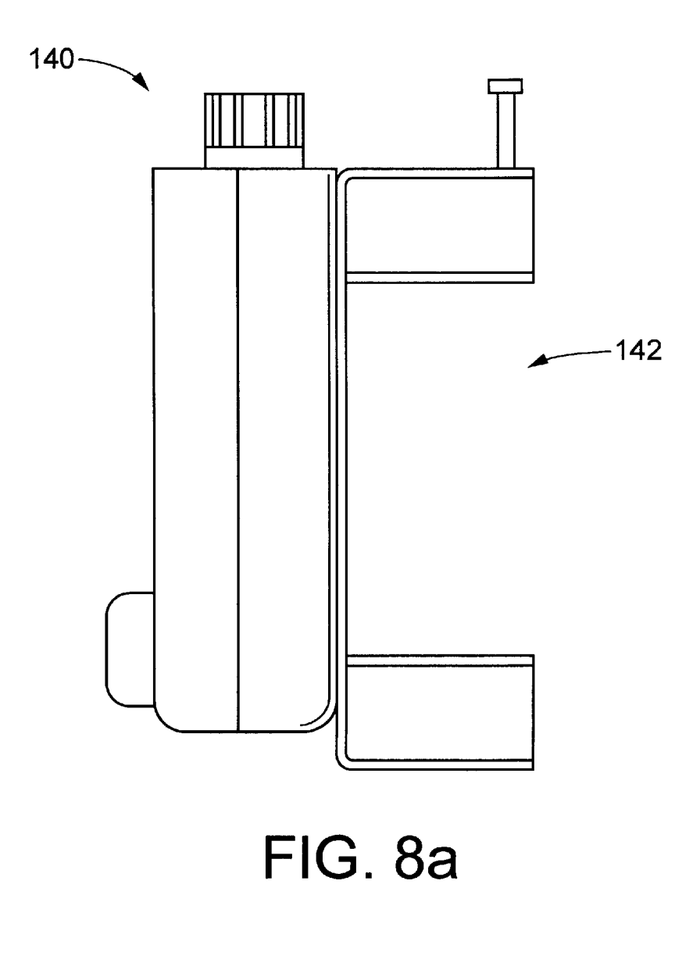
FIG. 8a is a side elevational view of a sensing mechanism in accordance with the present invention.
Figure 8B:
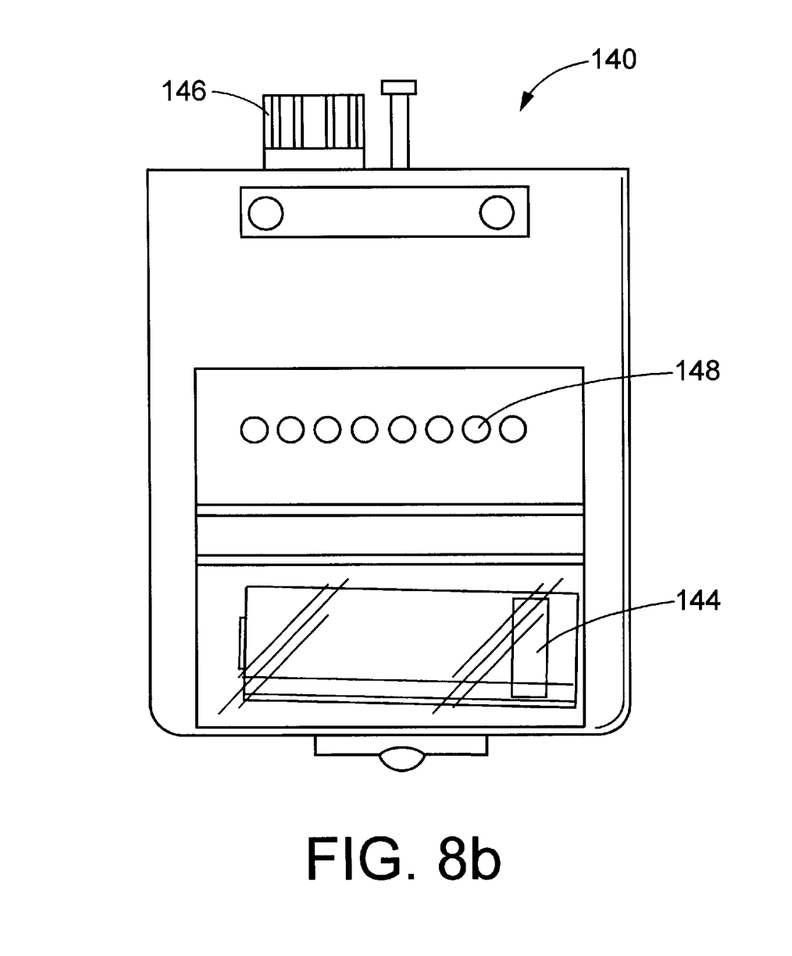

With reference to FIGS. 8a and 8b, the device for determining the spread or deflection of the spring members is preferably a conventional Hall Effect sensor 140 which operates much like a standard stud finder. The Hall Effect sensor includes a substantially U-shaped guide 142 which straddles a portion of an axial end of the filter cartridge. The toroidal or annular axial end of the filter cartridge operates as a track for sensor 140 to travel around. The sensor is preferably powered by a battery 144 and includes a power knob 146 for turning the sensor on and off and for adjusting the sensitivity thereof (FIG. 8b).

As the sensor travels around the circumference of the axial end of the filter cartridge, it is calibrated to measure the distance between the ends of legs 136, 138 of the spring members. The distance between the ends of legs 136, 138 will indicate how far the spring members have spread or deflected and, thus, whether voids have formed in the filtering media. A series of LED's 148 are provided on the Hall Effect sensor which light up depending upon the measured distance between the legs of the spring members. Thus, the number of LED's which light up will indicate the extent of spring deflection. For example, if all or several LED's light up upon applying the sensor to the cartridge, then the spring members have not deflected or spread much. Thus, there is likely no decreased pressure or formation of voids in the filtering media. On the other hand, if no LED's light up, then the spring members have spread a considerable distance and a decrease in pressure on the filtering media and the formation of voids is likely. This approach is advantageous because it provides a non-destructive process of testing to determine the quality of the filter assembly and to verify the continuity of the fill of the filtering media.

Figure 9A:
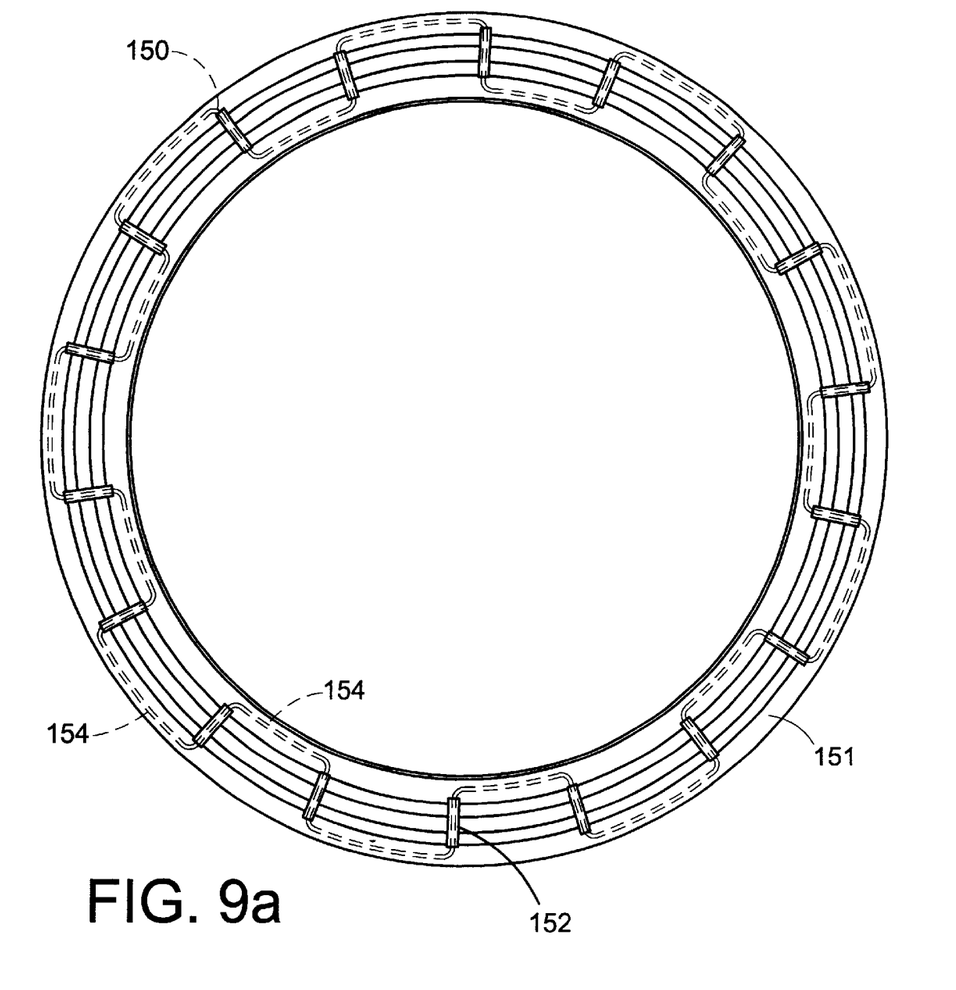
FIG. 9a is a top plan view of another preferred embodiment of a compression pad having a single spring member which can be tested for spread and deflection.
Figure 9B:
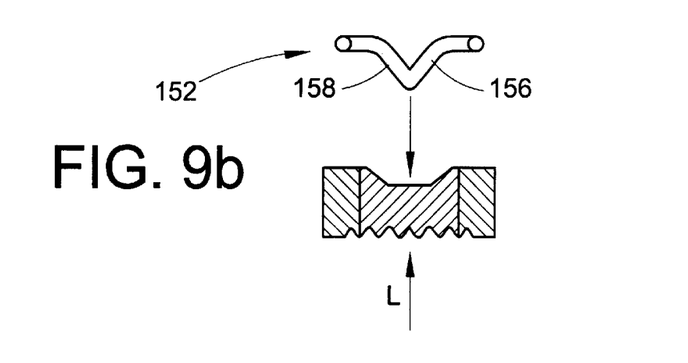

Turning now to FIGS. 9a and 9b, another embodiment of a compression pad is shown which enables a user to determine whether the filter assembly employing the compression pad is defective or whether there has been a reduction in compressive force over time. In this embodiment, a single spring member 150 is embedded around the circumference of the compression pad 151. The spring member weaves back and forth along the circumference of the compression pad from a position adjacent an inner side of the toroidal compression pad to a position adjacent an outer side of the compression pad. Spring member 150 is comprised of radial portions 152 and peripheral portions 154. Each of the radial portions comprises first and second legs 156, 158 which are angled in relation to each other in their normal unflexed condition, as illustrated in FIG. 9b.

As voids are formed in the filtering media of the cartridge, the pressure or load L exerted by the filtering media on the radial portions 152 of the spring member is decreased. This decreased pressure unloads or decompresses the radial portions of the spring member so that the legs 156, 158 contract toward each other. As a result, the peripheral portions 154 of the spring member retract from the sides of the toroidal compression pad. As the radial portions 152 contract and the peripheral portions retract from the sides of the compression pad, it is more likely that voids have formed in the filtering media.

In order to measure the extent of deflection or spread by the radial portions 152 of the spring member 150, the Hall Effect sensor 140 shown in FIGS. 8a and 8b is guided around the circumference of the end of the filter cartridge. Sensor 140 measures spring deflection by determining to what extent the peripheral portions 154 have retracted from the sides of the compression pad. As the distance between the side walls of the compression pad and the peripheral portions of the spring member increases, a decreased number of LED's on the sensor will light up. This indicates that a considerable amount of deflection has taken place and the formation of voids is likely. On the other hand, if negligible or very little deflection of the spring peripheral portions 154 away from the sidewalls of the cartridge has occurred, a large number of the LED's provided on the Hall Effect sensor will light up. Accordingly, formation of voids has not occurred.

The invention has been described with reference to the preferred embodiments. Obviously, modifications and alterations will occur to others upon the reading and understanding of this specification. For example, any suitable means may be provided in the compression pad which, upon the formation of voids in the filtering media, undergoes a change which can be detected by some type of sensing mechanism. Similarly, any suitable detecting mechanism may be used for detecting a change which indicates the formation of voids. The invention is intended to include all such modifications and alterations insofar as they come within the scope of the appended claims or the equivalents thereof.

What is claimed is:

1. A filter assembly with a non-destructive testing device comprising:

a substantially toroidal filter cartridge having a first outer cylindrical wall spaced from and surrounding a second inner cylindrical wall, said outer and inner walls defining an annular space therebetween;

a filtering media disposed within said annular space for removing contaminants from a fluid passing through said filter cartridge;

a first biasing assembly located at a first axial end of said filter cartridge for exerting an approximately constant compression force on said filtering media; and a sensing mechanism selectively applied to said filter cartridge for detecting changes in said biasing assembly which indicate the approximately constant compression force on said filtering media.

2. The filter assembly of claim 1, wherein said first biasing assembly includes a plurality of spring members spaced concentrically around a circumference of said first axial end of said filter cartridge, said spring members being configured to contract and unload when a pressure of said filtering media is less than a loading of said spring members.

3. The filter assembly of claim 2, wherein said spring members spread in a radial direction of said filter cartridge.

4. The filter assembly of claim 2, wherein said sensing mechanism is calibrated to measure an unloading of said spring members.

5. The filter assembly of claim 1, wherein said sensing mechanism is a Hall Effect sensor.

6. The filter assembly of claim 5, wherein said sensing mechanism includes a plurality of LED's which are selectively lit as a function of the measured spread and unloading of said spring members, said LED's indicating the extent to which defects have formed in said filtering media.

7. The filter assembly of claim 1, wherein said first biasing assembly is made from a ferrous material and a remaining portion of said filter cartridge is made from a non-ferrous material.

8. The filter assembly of claim 1, wherein a second biasing assembly is located at a second axial end of said filter cartridge.

9. The filter assembly of claim 1, wherein said first biasing assembly includes a single spring member arranged concentrically around a circumference of said first axial end of said filter cartridge, said spring member having select portions pre-loaded into a compressed position.

10. The filter assembly of claim 9, wherein said pre-loaded portions of said spring member begin to contract and unload upon the pressure of said filtering media becoming less than the loading of said pre-loaded portions of said spring member.

11. The filter assembly according to claim 10, wherein said sensing mechanism is calibrated to measure the unloading of said pre-loaded portions of said spring member.

12. The filter assembly according to claim 9, wherein said spring member includes a plurality of radial portions interconnected with a plurality of peripheral portions, said radial portions being configured to unload upon the pressure of said filtering media being less than the loading of said radial portions, said unloading of said radial portions urging said peripheral portions of said spring member away from inner and outer annular side walls of said annular filter cartridge, said sensing mechanism measuring a distance between said peripheral members and said side walls.

13. A filter assembly comprising:
a substantially toroidal filter cartridge having a first outer cylindrical wall spaced from and surrounding a second inner cylindrical wall, said outer and inner cylindrical walls defining an annular space therebetween;
a filtering media disposed within said annular space for removing contaminants from a fluid passing through said filter cartridge;
a first biasing assembly disposed at a first axial end of said filter cartridge, said first biasing assembly having at least a portion configured to unload in a direction other than an axial direction of said filter cartridge when a force exerted by said filtering media is less than a loading of said biasing member.

14. The filter assembly of claim 13, wherein said first biasing assembly includes a plurality of spring members spaced around a circumference of said first axial end of said filter cartridge.

15. The filter assembly of claim 14, wherein said spring members spread in a radial direction of said filter cartridge.

16. The filter assembly of claim 13, wherein said first biasing assembly is made from a ferrous material and a remaining portion of said filter cartridge is made from a non-ferrous material.

17. The filter assembly of claim 13, wherein a second biasing assembly is located at a second axial end of said filter cartridge.

18. The filter assembly of claim 13, wherein said first biasing assembly includes a single spring member arranged concentrically around a circumference of said first axial end of said filter cartridge.

19. The filter assembly according to claim 18, wherein said spring member includes a plurality of pre-loaded radial portions interconnected with a plurality of peripheral portions, said radial portions being configured to spread and unload upon the pressure of said filtering media exceeding the loading of said radial portions, said spreading and unloading of said radial portions urging said peripheral portions of said spring member closer to inner and outer annular side walls of said annular filter cartridge.

20. A method of non-destructively testing a filter assembly to verify continuity of a filtering media disposed within a filter cartridge of the filter assembly, the method comprising the steps of:
positioning a biasing member at a first axial end of the filter cartridge;
applying an approximately continuous force on the filtering media with the biasing member; and
measuring a movement of the biasing member in relation to a pair of opposed side walls of the filter cartridge.

* * * * *